United States Patent [19]

Bradley, Jr.

[11] Patent Number: 4,684,284
[45] Date of Patent: Aug. 4, 1987

[54] ANTI-ROTATION LOCK ASSEMBLY

[75] Inventor: Charles D. Bradley, Jr., Gobles, Mich.

[73] Assignee: Pneumo Abex Corporation, Boston, Mass.

[21] Appl. No.: 873,696

[22] Filed: Jun. 12, 1986

[51] Int. Cl.$^4$ .................. F16B 29/00; F16B 39/36
[52] U.S. Cl. ................ 403/320; 403/319;
  403/356; 403/343; 411/253; 411/270; 411/221;
  411/935
[58] Field of Search ........ 411/217, 219, 221, 266–270,
  411/237, 247, 248, 253, 198, 935; 403/315–320,
  344, 343, 356, 358, 304, 13, 14, 104, 109

[56] References Cited

U.S. PATENT DOCUMENTS

| | | | |
|---|---|---|---|
| 1,344,544 | 6/1920 | Lorenz | 411/268 X |
| 1,607,274 | 11/1926 | Hecht | 411/935 X |
| 2,676,025 | 4/1954 | Davis | 403/344 X |
| 4,092,080 | 5/1978 | Bradley | 403/319 |
| 4,183,694 | 1/1980 | Dent | 403/320 |
| 4,218,156 | 8/1980 | Logan | 403/320 |
| 4,274,754 | 6/1981 | Cohen | 403/320 X |
| 4,378,187 | 3/1983 | Fullerton | 411/267 |

Primary Examiner—Cornelius J. Husar
Assistant Examiner—Todd G. Williams
Attorney, Agent, or Firm—Renner, Otto, Boisselle & Lyon

[57] ABSTRACT

Anti-rotation lock asembly includes a male threaded member that may be releasably locked in any desired axially adjusted position relative to a mating female threaded member by means of one or more wedge keys that are forced axially into notches in an end face of the female threaded member and radially against flats or keyways on the male threaded member. Surrounding the male member is a key retaining ring which retains the wedge keys on the male member when the wedge keys are disengaged from the female member to permit relative rotation between the male and female members for adjustment of the male member in or out relative to the female member. The wedge keys are retained in radial slots in the retaining ring which prevent relative axial movement between the wedge keys and retaining ring while permitting limited radial movement therebetween.

15 Claims, 5 Drawing Figures

U.S. Patent   Aug. 4, 1987   4,684,284
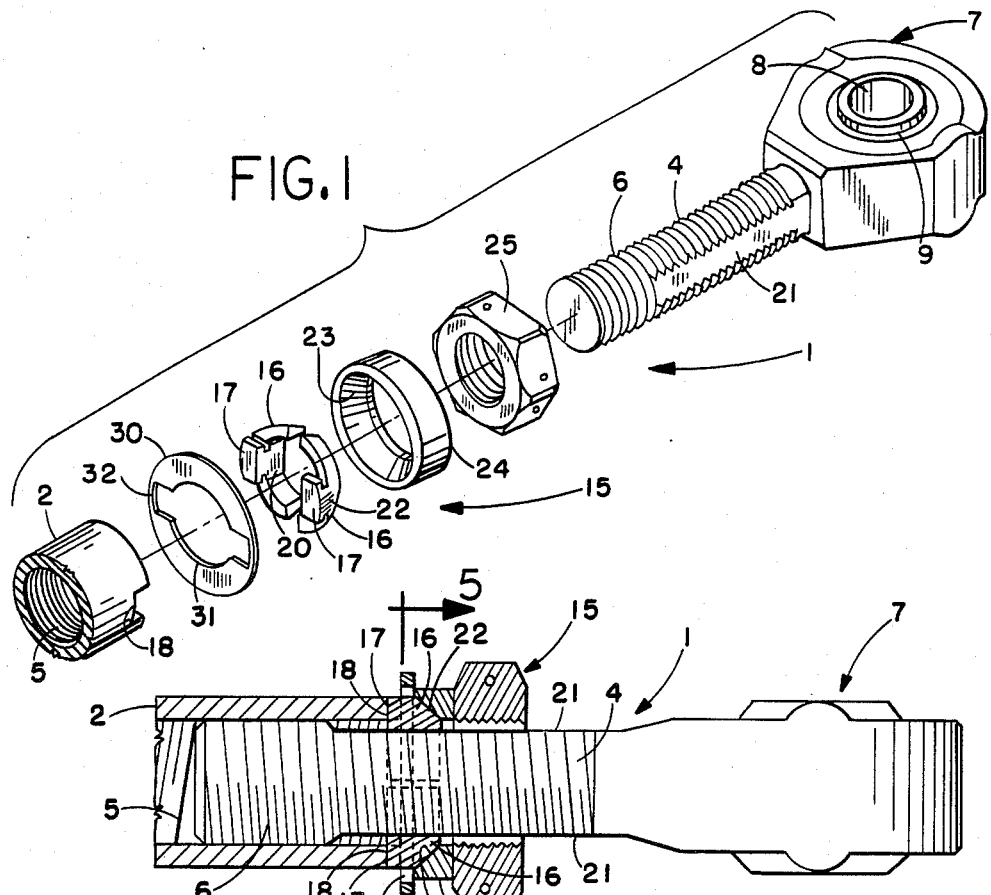
FIG. 1
FIG. 2
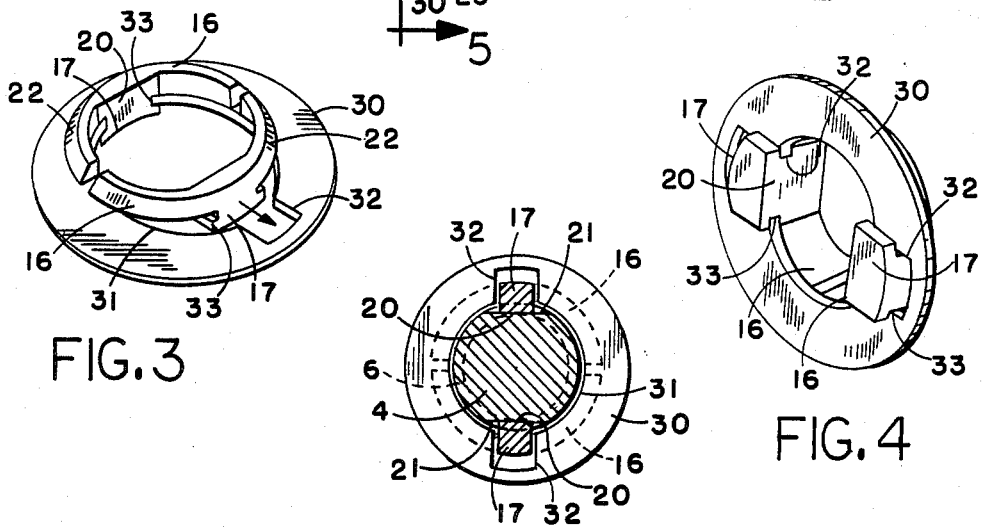
FIG. 3
FIG. 5
FIG. 4

ANTI-ROTATION LOCK ASSEMBLY

BACKGROUND OF THE INVENTION

This invention relates generally as indicated to an anti-rotation lock assembly for a threaded connection including particularly a key retaining ring for preventing one or more wedge keys from being dislodged and lost when the lock assembly is loosened and the male threaded member is rotated during longitudinal adjustment in or out relative to a mating female threaded member.

The anti-rotation lock assembly of the present invention is preferably generally of the type disclosed in U.S. Pat. No. 4,092,080, which is incorporated herein by reference and is assigned to the same assignee as the present application. As disclosed in such patent, the male threaded member may be releasably locked in any desired longitudinal adjusted position relative to the mating female threaded member by means of one or more wedge keys that are forced both into respective notches or slots in an end face of the female threaded member and against respective flats or keyways on the male threaded member. However, the particular anti-rotation lock assembly disclosed in such patent has the objection that when the lock assembly is loosened to permit the male threaded member to be rotated for adjustment in or out relative to the female threaded member, the wedge keys may be dislodged and lost.

SUMMARY OF THE INVENTION

With the foregoing in mind, it is a principal object of this invention to provide an anti-rotation lock assembly of the type generally described but which includes novel means for retaining the wedge keys on the male threaded member during adjustment of the male threaded member in or out relative to the female threaded member.

These and other objects of the present invention may be achieved by providing a key retaining ring for retaining the wedge keys on the male threaded member during such adjustment. The sides of the wedge keys have slots therein which engage the side edges of radially outwardly extending slots in the key retaining ring to maintain the wedge keys in proximity to the male threaded member, the male threaded member preventing the wedge keys from being radially disengaged from the slots.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is an exploded perspective view of the various components of a preferred form of anti-rotation lock assembly in accordance with the present invention;

FIG. 2 is a fragmentary longitudinal section through the anti-rotation lock assembly of FIG. 1 shown in its assembled condition;

FIG. 3 is an enlarged perspective view of the back sides of a pair of wedge keys of the anti-rotation lock assembly of FIGS. 1 and 2 shown being inserted into a key retaining ring;

FIG. 4 is an enlarged perspective view of the front side of the wedge keys of FIG. 3 shown fully inserted in the key retaining ring; and FIG. 5 is an enlarged transverse section through the anti-rotation lock assembly of FIG. 2 taken generally along the plane of the line 5—5 thereof.

DETAILED DESCRIPTION OF THE PREFERRED EMBODIMENT

Referring now in detail to the drawings, and initially to FIGS. 1 and 2, there is shown a preferred form of anti-rotation lock assembly 1 in accordance with this invention including a female threaded member 2 having internal threads 5 at the outer end thereof, and a male threaded member 4 having external threads 6 adapted to threadedly engage the internal threads 5 of the female member. The female member 2 may, for example, be the rod of a linear fluid actuator, and the male member 4 a portion of a rod end assembly 7 which may be rotated relative to the rod 2 to move the rod end assembly 7 longitudinally in or out to adjust the overall length of the rod. The outermost end of the male threaded member 4 may have a suitable mount thereon such as an eye 8 containing an apertured spherical ball joint member 9 to facilitate attachment to a part to be actuated.

Following such adjustment, the male and female threaded members 2, 4 may be releasably locked in the desired longitudinal adjusted position by means of an anti-rotation lock assembly 15. The particular anti-rotation lock assembly 15 shown is generally of the type disclosed in the aforementioned U.S. Pat. No. 4,092,080, and includes one or more wedge keys 16 which act as locking members each having an axial key-like projection 17 adapted to engage a respective slot or notch 18 in an end face of the female threaded member 2 and an internal flat-like projection 20 adapted to engage respective elongated flats or keyways 21 on the male threaded member 4. As clearly shown in FIGS. 2–5, each wedge key 16 has an arcuate length less than a semi-circle. Also, the flat-like projection 20 and key-like projection 17 on each of the wedge keys 16 are desirably axially coextensive and centered with respect to the arcuate length of such wedge keys. On the end of the wedge keys opposite the key-like projections 17 is an external wedge or tapered surface 22 engageable by a similarly inclined internal wedge surface 23 on a key loading ring 24. In addition, the anti-rotation lock assembly 15 includes a jam nut 25 designed to mate with the external threads 6 on the male member 4.

To form the assembly, first the jam nut 25 is threaded onto the externally threaded male member 4 and the key loading ring 24 is slipped over the male member before threadedly attaching the male member to the female member 2. Likewise, the wedge keys 16 are inserted into a key retaining ring 30 in accordance with this invention and the key retaining ring 30 is slipped over the male threaded member to maintain the wedge keys in assembled relation around the male threaded member as described hereafter before threading the male member into the female member.

As shown, the key retaining ring 30 has a central opening 31 therethrough of a diameter somewhat greater than the outer diameter of the male threaded member 4 for ease of insertion of the key retaining ring over the threaded end of the male member. Extending radially outwardly from the wall of the central opening 31 are one or more slots 32. The number of slots 32 corresponds to the number of wedge keys 16 utilized in the assembly.

As evident from FIGS. 3-5, the opposite sides of each key-like projection 17 have radial slots 33 therein for receipt of the opposite side edges of the respective slots 32 in the key retaining ring 30 for retaining the wedge keys 16 against axial movement relative to the key retaining ring while permitting limited radial movement. The depth of the slots 32 is such that one of the wedge keys 16 may be inserted into the center opening 31 and moved radially outwardly in the respective slot 32 a sufficient distance so as not to interfere with the subsequent insertion and radial outward movement of the other wedge key in its associated slot as illustrated in FIG. 3. However, when the wedge keys 16 are fully assembled in the respective slots 32 in the key retaining ring 30 as shown in FIG. 4 and the key retaining ring is slipped over the male threaded member 4 as shown in FIGS. 2 and 5, the male threaded member will prevent the wedge keys from moving sufficiently radially inwardly within the slots 32 to permit the wedge keys to be disengaged from the key retaining ring.

When the female and male threaded members 2, 4 are in the desired longitudinally adjusted position, the flats or keyways 21 on the male member may be radially aligned with the slots or notches 18 on the end face of the female member and the key retaining ring 30 rotated to bring the key-like projections 17 on the wedge keys 16 into axial alignment with the respective notches 18 and the internal flat-like projections 20 into radial alignment with the flats or keyways 21 on the male member. The key loading ring 24 is then moved into wedging engagement with the wedge keys 16 and the jam nut 25 is tightened against the key loading ring so that the respective reacting wedge surfaces 23, 22 on the key loading ring and wedge keys force the internal flats or projections 20 against the flats 21 on the male threaded member and the key-like projections 17 axially into the notches 18 in the female threaded member to lock the male and female members against relative rotation.

From the foregoing, it will now be apparent that the respective mating flats 21, 20 on the exterior of the male member 4 and the interior of the wedge keys 16 function as a key and keyway, one being a depression or slot in the external surface of the male member, and the other being an internal projection from the semi-annular surface of the respective wedge keys. Also, it will be appreciated that the number of notches 18 in the end face of the female member 2 as well as the number of wedge keys 16 cooperating therewith may vary. Furthermore, the particular configuration of the mating inclined surfaces 22, 23 between the wedge keys 16 and key loading ring 24 may vary, and the key loading ring 24 and nut 25 may be formed integrally.

Longitudinal adjustment of the male member 4 in or out relative to the mating female member 2 may be accomplished simply by loosening the jam nut 25 sufficiently to permit the key-like projections 17 on the wedge keys 16 to be moved longitudinally out of engagement with the notches 18 in the female member so that the male member may be rotated relative to the female member. During such longitudinal adjustment, there need not be any concern about the wedge keys 16 becoming dislodged from the key loading ring 24 and lost, since the key retaining ring 30 will maintain the wedge keys in proximity to the exterior surface of the male member and the male member will prevent the wedge keys 16 from disengaging from the slots 32 in the key retaining ring.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

I claim:

1. An anti-rotation lock assembly between an internally threaded female member and an externally threaded male member in threaded engagement with each other comprising lock means movable between a first position permitting relative rotation between said members for adjustment of said male member axially in or out relative to said female member and a second position locking said members against relative rotation, force applying means for releasably moving said lock means from said first position to said second position, and retaining means for retaining said lock means on said male member when said force applying means is released, said retaining means comprising a retaining ring surrounding said male member, said retaining ring having a central opening of a size somewhat larger than the outer diameter of a threaded end of said male member, and a radial slot extending radially outwardly from said central opening, said lock means having a portion thereof mounted in said radial slot for radial movement of said lock means toward and away from the exterior surface of said threaded end.

2. The assembly of claim 1 wherein said lock means has spaced apart sides containing radial slots, and said radial slot in said retaining ring has opposite side edges which are received in said radial slots in said spaced apart sides of said lock means for retaining said lock means against axial movement relative to said retaining ring while permitting limited radial movement.

3. The assembly of claim 1 wherein said lock means comprises a locking member having an axial projection adapted to fit in a notch in an end face of said female member and an internal flat adapted to mate with an external flat on said male member, said force applying means being operative to force said locking member both axially and radially in turn to force said projection on said locking member into said notch and the flat on said locking member against the flat on said male member.

4. The assembly of claim 3 wherein there is another notch in said end face of said female member and another external flat on said male member, and said retaining ring has another radial slot extending radially outwardly from said central opening, and said locking member comprises a pair of semi-circular wedge keys each having an axial projection adapted to fit in said notches in said end face of said female member, an internal flat adapted to mate with said external flats on said male member, and a portion mounted in said radial slots for limited radial movement of said wedge keys toward and away from said male member.

5. An anti-rotation lock assembly between an internally threaded female member and an externally threaded male member comprising a notch in an end face of said female member, an external flat on said male member, a locking member having an axial projection adapted to fit in said notch and an internal flat adapted to mate with said external flat on said male member, force applying means for releasably forcing said locking member both axially and radially in turn to force said projection on said locking member into said notch and said internal flat on said locking member against said external flat on said male member, and retaining means for retaining said locking member on said male member when said force applying means is released, said retaining means comprising a retaining ring surrounding said male member, said retaining ring having a central opening of a size somewhat larger than the outer diameter of a threaded end of said male member, and a radial slot extending radially outwardly from said central opening, said locking member having a portion thereof mounted in said radial slot for limited radial movement of said locking member toward and away from said threaded end of said male member.

6. The assembly of claim 5 further comprising means on said male member preventing removal of said retaining ring from said male member except by threadedly disengaging said male member from said female member and sliding said retaining ring off said threaded end of said male member.

7. The assembly of claim 5 wherein said locking member has spaced apart sides containing radial slots, and said radial slot in said retaining ring has opposite side edges which are received in said radial slots in said spaced apart sides of said locking member for retaining said locking member against axial movement relative to said retaining ring while permitting limited radial movement.

8. The assembly of claim 7 wherein the radial slots in said locking member are on opposite sides of said axial projection.

9. An anti-rotation lock assembly between an internally threaded female member and an externally threaded male member comprising a pair of notches in an end face of said female member, a pair of external flats on said male member, a pair of locking members each having an axial projection adapted to fit in said notches in said end face of said female member and an internal flat adapted to mate with said external flats on said male member, force applying means for releasably forcing said locking members both axially and radially in turn to force said projections on said locking members into said notches and said internal flats on said locking members against said external flats on said male member, and retaining means for retaining said locking members on said male member when said force applying means is released, said retaining means comprising a retaining ring surrounding said male member, said retaining ring having a central opening of a size somewhat larger than the outer diameter of a threaded end of said male member, and a pair of circumferentially spaced radial slots extending radially outwardly from said central opening in said retaining ring, each of said locking members having a portion thereof mounted in said radial slots for radial movement of said locking members toward and away from said threaded end of said male member.

10. The assembly of claim 9 wherein each of said locking members has spaced apart sides containing radial slots, and said radial slots in said retaining ring have opposite side edges which are received in the respective radial slots in the spaced apart sides of said locking members for retaining said locking members against axial movement relative to said retaining ring while permitting limited radial movement.

11. The assembly of claim 10 wherein the radial slots in each of said locking members are in opposite sides of each of said axial projections.

12. The assembly of claim 9 wherein said pair of locking members comprises a pair of semi-circular wedge keys in circumferentially spaced relation around said male member, each of said wedge keys having said axial projection adapted to fit in said spaced apart notches in said end face of said female member, said internal flat adapted to mate with said spaced apart external flat on said male member, and said portion mounted in said radial slots for radial movement of said wedge keys toward and away from said male member.

13. The assembly of claim 12 wherein the projection and flat on each wedge key are axially coextensive, and each of said projections has spaced apart sides containing radial slots, and the radial slots in said retaining ring have opposite side edges which are received in the respective radial slots in the spaced apart sides of said projections for retaining said wedge keys against axial movement relative to said retaining ring while permitting limited radial movement.

14. The assembly of claim 11 wherein each of said semi-circular wedge keys has an external semi-circular wedge surface, and said force applying means comprises a loading ring having an internal wedge surface cooperating with the wedge surfaces of said wedge keys.

15. The assembly of claim 14 wherein said force applying means further comprises a nut threaded on said male member operative to drive said loading ring against said wedge keys and thus said wedge keys both axially into engagement with said notches in said female member and radially into engagement with the external flats on said male member.

* * * * *